United States Patent
Kitanaka et al.

(10) Patent No.: US 7,233,139 B2
(45) Date of Patent: Jun. 19, 2007

(54) METHOD AND APPARATUS FOR SENSING ANGLE OF ROTATION WHICH COMPENSATES AN OUTPUT SIGNAL FROM A MAGNETIC SENSOR ELEMENT IRRESPECTIVE OF THE RANGE OF ROTATIONAL ANGLES OF A TARGET OBJECT

(75) Inventors: Tatsuya Kitanaka, Nagoya (JP); Takao Ban, Toyohashi (JP)

(73) Assignee: DENSO Corporation, Kariya (JP)

( * ) Notice: Subject to any disclaimer, the term of this patent is extended or adjusted under 35 U.S.C. 154(b) by 39 days.

(21) Appl. No.: 11/146,007

(22) Filed: Jun. 7, 2005

(65) Prior Publication Data
US 2005/0275399 A1 Dec. 15, 2005

(30) Foreign Application Priority Data
Jun. 14, 2004 (JP) ............................. 2004-175587

(51) Int. Cl.
*G01B 7/30* (2006.01)
(52) U.S. Cl. ........................... 324/207.12; 324/207.25; 324/207.2
(58) Field of Classification Search ............................. 324/270.12–207.25
See application file for complete search history.

(56) References Cited

U.S. PATENT DOCUMENTS

| | | | |
|---|---|---|---|
| 3,194,990 A | * | 7/1965 | Kendall .................. 310/10 |
| 4,283,679 A | * | 8/1981 | Ito et al. .................. 324/165 |
| 5,453,684 A | | 9/1995 | Nakayama |
| 6,489,761 B1 | * | 12/2002 | Schroeder et al. ..... 324/207.25 |
| 2002/0124663 A1 | | 9/2002 | Tokumoto et al. |
| 2004/0010386 A1 | | 1/2004 | Kameya et al. |

FOREIGN PATENT DOCUMENTS

| | | | |
|---|---|---|---|
| DE | 0 194 932 | * | 6/1986 |
| JP | 60-47901 | | 3/1985 |
| JP | 62-95402 | | 5/1987 |

* cited by examiner

*Primary Examiner*—Jay M. Patidar
(74) *Attorney, Agent, or Firm*—Nixon & Vanderhye P.C.

(57) ABSTRACT

An angular position sensor including a magnetic field generator means and a magnetic sensor means. The magnetic field generator means produces a magnetic field. The magnetic sensor means has a first magnetic sensor element, a second magnetic sensor element, and a third magnetic sensor element each for providing an output signal depending on a direction of the magnetic field. One of the magnetic field generator means and the magnetic sensor means rotates in conjunction with the target object. The magnetic sensor elements are located so as to provide output signals having different phase differences by allowing the magnetic sensor means to rotate relative to the magnetic field generator means. The magnetic sensor elements are also located such that an output signal of each magnetic sensor element has a phase different from an inverted phase of an output signal of the other two magnetic sensor elements.

8 Claims, 7 Drawing Sheets

| Va | Vb | ROTATION ANGLE |
|----|----|----------------|
| +  | +  | 0~90           |
| +  | −  | 90~180         |
| −  | −  | 180~270        |
| −  | +  | 270~360        |

METHOD AND APPARATUS FOR SENSING ANGLE OF ROTATION WHICH COMPENSATES AN OUTPUT SIGNAL FROM A MAGNETIC SENSOR ELEMENT IRRESPECTIVE OF THE RANGE OF ROTATIONAL ANGLES OF A TARGET OBJECT

CROSS REFERENCE TO RELATED APPLICATIONS

This application is based upon and claims the benefit of priority of Japanese Patent Application No. 2004-175587, filed on Jun. 14, 2004, the contents of which are incorporated herein by reference.

FIELD OF THE INVENTION

The present invention relates to a method and an apparatus for sensing the angle of rotation of a target object.

BACKGROUND OF THE INVENTION

Various types of angular position sensors are known. For example, as a target object rotates, one of those angular position sensors is adapted to rotate magnetic sensor means having two magnetic sensor elements relative to magnetic field generator means such as permanent magnets. Then, the angular position sensor detects an angle of rotation of the target object based on an output signal of the magnetic sensor elements which varies as the target object rotates (e.g., see Japanese Patent Laid-Open Publications Nos. 62-95402 and 60-47901).

Figures 8A, 8B:
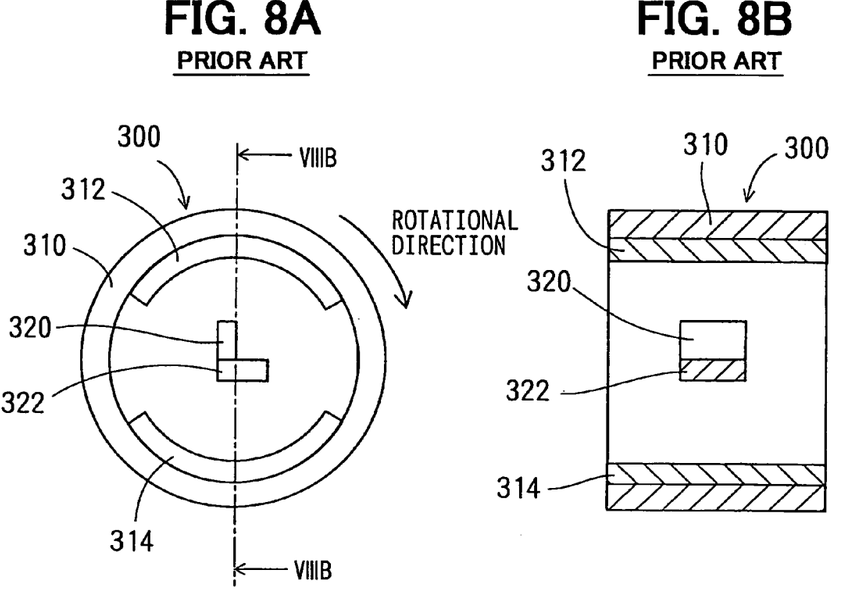
FIG. 8A is a schematic end view of a conventional angular position sensor.
FIG. 8B is a cross-sectional view of the conventional angular position sensor taken through line VIIIB-VIIIB of FIG. 8A.

An example of such an angular position sensor is shown in FIG. 8. The angular position sensor includes a pair of permanent magnets 312 and 314, which are attached to the inner circumferential wall of a cylindrical yoke 310 to form a parallel magnetic field. The yoke 310 and the permanent magnets 312 and 314 rotate in conjunction with a target object whose angle of rotation is to be detected. For example, provided generally at the center of the yoke 310 as the magnetic sensor element are Hall elements 320 and 322 which are supported by a support member to form an angle of 90 degrees to each other in the direction of rotation of the target object. That is, as shown in FIG. 9, output signals 100 and 102 from the Hall elements 320 and 322 are different in phase by 90 degrees from each other, the output signals having a sine and cosine relation.

Figure 9:
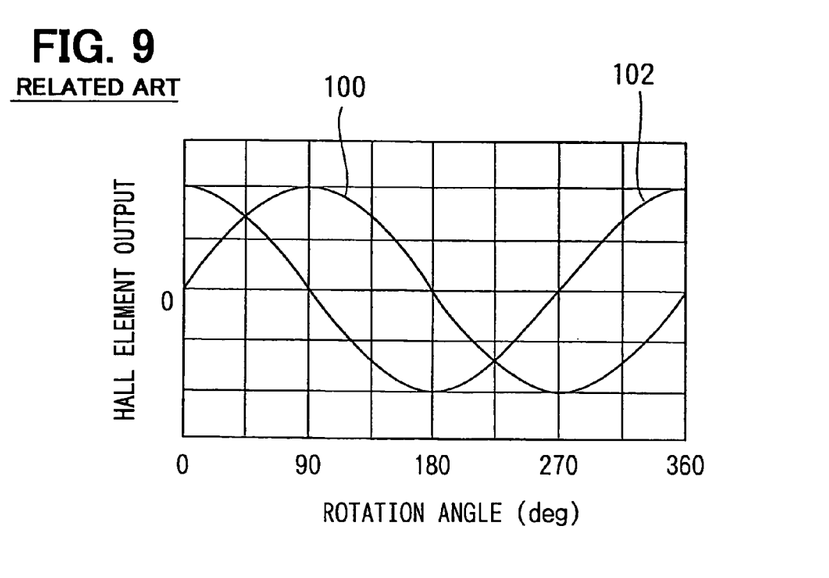
FIG. 9 is a graph showing a relationship between a rotational angle and a output from a Hall element of a related angular position sensor.
Figure 10:
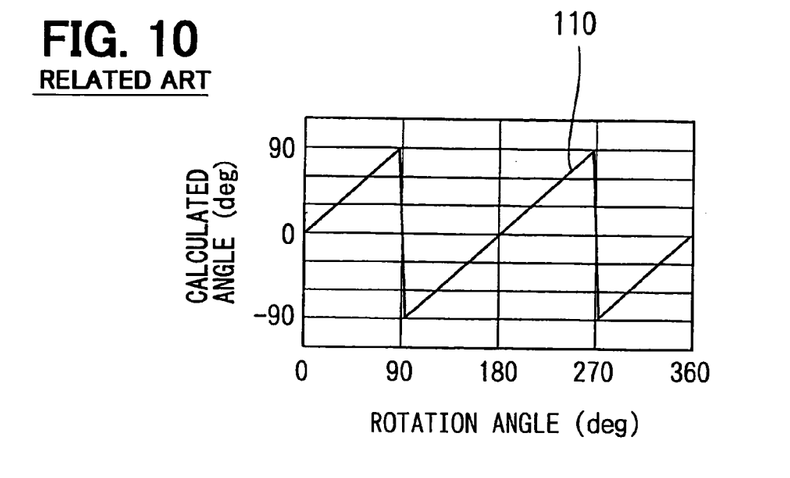
FIG. 10 is a graph showing a relationship between the rotational angle and a calculated angle determined through a trigonometric inverse operation performed on output signals according to the related angular position sensor.

Accordingly, as shown in FIG. 10, applying a trigonometric arc tangent operation to the output signals 100 and 102 shown in FIG. 9 results in a calculated angle 110 which varies in a cycle of 180 degrees in a one-to-one relation with the angle of rotation of the target object.

Figure 11:
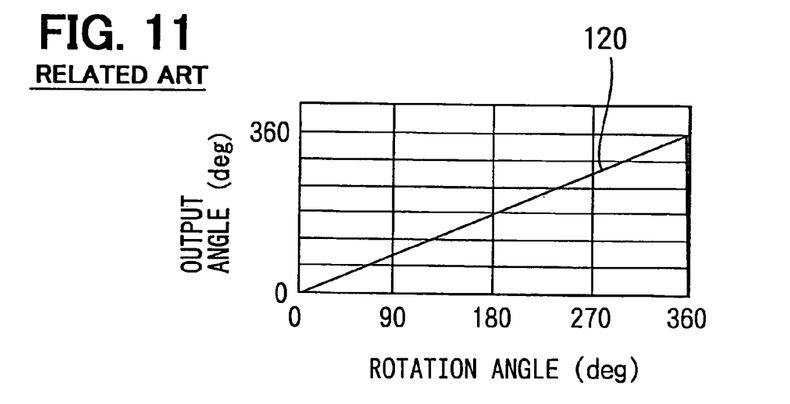
FIG. 11 is a graph showing a relationship between the rotational angle and an output angle with an offset angle added to the calculated angle shown in FIG. 10 to have a cycle of 360 degrees according to the related angular position sensor.
Figure 12:
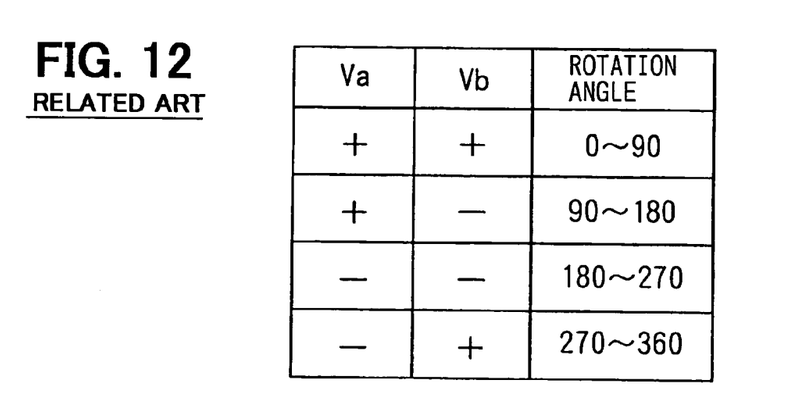
FIG. 12 is a table showing a relationship between the signs of output signals and the rotational angle according to the related angular position sensor.

Then, as shown in FIG. 12, the rotational angular position of the target object is identified within a range from 0 to 360 degrees in accordance with the sign of the output signals 100 (Va) and 102 (Vb). Then, an offset angle is added to the calculated angle 110 of FIG. 10 to provide a combined calculated angle 110, thereby providing an output angle 120 which varies in a cycle of 360 degrees in a one-to-one relation with the angle of rotation of the target object, as shown in FIG. 11. This makes it possible to detect the angle of rotation of the target object within a range from 0 to 360 degrees.

Figure 13:
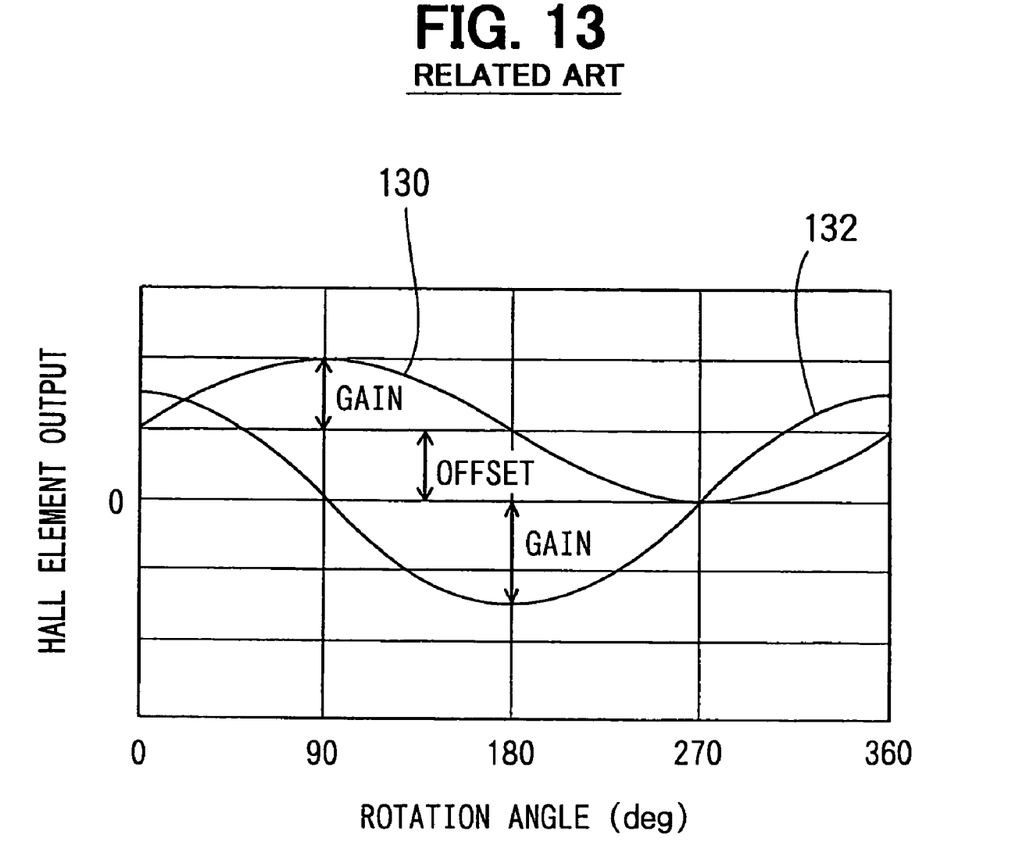
FIG. 13 is a graph showing a relationship between the offset and a gain of the output signal and the rotational angle according to the related angular position sensor.

However, in practice, like an output signal 130 shown in FIG. 13, an offset may be added to the output signal of a Hall element, so that the signal is shifted from the center of oscillation. Furthermore, some variations in gain of the output signals 130 and 132 may also be found between the Hall elements. These offset and variation in gain may be caused during manufacture of the Hall elements or installation of the angular position sensor.

The angle of rotation of the target object cannot be properly determined from output signals which have an offset or a variation in gain. It is thus necessary to make a correction to the offset and the gain of the output signals 130 and 132 in order to determine the angle of rotation, as described in Japanese Patent Laid-Open Publications Nos. 2001-311605 and 2004-45286.

As described in Japanese Patent Laid-Open Publications Nos. 2001-311605 and 2004-45286, a correction is made by detecting the minimum and maximum value of the output signals and then determining their offset and gain. However, for example, using Hall elements as the magnetic sensor element requires a rotation of 180 degrees or more of the permanent magnets or the like which form a magnetic field, thereby resulting in an increase in time for correcting the output signals.

Furthermore, suppose that the angular position sensor attached to a target object may degrade over time, so that the output signal from a Hall element needs to be corrected. In this case, for example, the range of rotational angles of the target object being as narrow as less than 90 degrees would also raise another problem that the minimum or maximum value of the output signal cannot be determined, thereby causing no correction to be made to the output signal.

SUMMARY OF THE INVENTION

The present invention was developed to address the aforementioned and other problems. It is therefore an object of the invention to provide an angular position sensing method and an apparatus, which requires reduced time for compensating an output signal from a magnetic sensor element irrespective of the range of rotational angles of a target object.

According to one aspect of the present invention, one of the magnetic field generator means and the magnetic sensor means rotates in conjunction with a target object whose angle of rotation is to be detected. The first, second, and third magnetic sensor elements of the magnetic sensor means provide output signals which vary depending on the direction of a magnetic field produced by the magnetic field generator means. The three magnetic sensor elements are located so as to provide output signals having mutually different phase differences by allowing the magnetic sensor means to rotate relative to the magnetic field generator means. Additionally, the three magnetic sensor elements are also located such that an output signal of each magnetic sensor element has a phase different from inverted phases of output signals of the other two magnetic sensor elements.

With the magnetic sensor elements of the magnetic sensor means located in this manner, it is possible to detect an offset of each magnetic sensor element in the absence of a magnetic field produced by the magnetic field generator means, e.g., without the magnetic field generator means being installed. The offset detected can be used to correct the output of the magnetic sensor elements.

After the correction is made to the offsets of the magnetic sensor elements, the gains of the outputs from the first and second magnetic sensor elements are corrected so that the outputs from the first and second magnetic sensor elements coincide with each other. The correction is made in the presence of the magnetic field produced by the magnetic field generator means at a rotational angular position of the target object at which the third magnetic sensor element provides an output of zero.

In this manner, corrections are made to the offsets of the three magnetic sensor elements and then to the gains of the first and second magnetic sensor elements. This makes it possible to detect the angle of rotation of the target object by performing a trigonometric inverse operation on the outputs of the first and second magnetic sensor elements.

Furthermore, at a rotational angular position at which the third magnetic sensor element provides an output of zero, it is possible to correct the gains of the first and second magnetic sensor elements. Accordingly, the angular position sensor may be attached to the target object at the rotational angular position at which the third magnetic sensor element provides an offset-corrected output of zero within the range of rotational angles of the target object. This arrangement with the angular position sensor attached to the target object allows for correcting the gain only by slightly rotating the target object, i.e., irrespective of the range of rotational angles of the target object.

Accordingly, even in the case of a target object having a narrow range of rotational angles, it is possible to readily correct the gains of the first and second magnetic sensor elements. As a result, it is possible to easily correct for a variation in gain of the magnetic sensor element caused by a change over time after the angular position sensor has been attached to the target object.

According to another aspect of the present invention, since a Hall element whose output varies in a cycle of 360 degrees is used as the magnetic sensor element, the angle of rotation of the target object can be detected in a range of 360 degrees.

According to still another aspect of the present invention, a Hall element whose output varies in a cycle of 360 degrees is used as the first and second magnetic sensor elements, which are located so as to provide output signals having a phase difference of 90 degrees in a sine and cosine relation. Accordingly, it is possible to easily calculate the angle of rotation of the target object through a trigonometric arc tangent operation.

According to still another aspect of the present invention, a magneto-resistive element whose output varies in a cycle of 180 degrees is employed as the magnetic sensor element, thereby making it possible to detect the angle of rotation of the target object in a range of 180 degrees.

According to still another aspect of the present invention, a magnetic sensor element whose output varies in a cycle of 180 degrees is used as the first and second magnetic sensor elements, which are located so as to provide output signals having a phase difference of 45 degrees in a sine and cosine relation. Accordingly, it is possible to easily calculate the angle of rotation of the target object through a trigonometric arc tangent operation.

Yet another aspect of the present invention provides an additional feature to the arrangement described above such that the output signals of the first and second magnetic sensor elements have a sine and cosine relation. That is, an angle formed in the rotational direction of the target object between the first and third magnetic sensor elements is equal to an angle formed in the rotational direction of the target object between the second and third magnetic sensor elements. In other words, at an angular position at which the third magnetic sensor element provides an output of zero, the outputs of the first and second magnetic sensor elements would coincide with each other if no variation in gain exists.

Accordingly, it is easy to correct the gain of the outputs of the first and second magnetic sensor elements.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Now, the present invention will be described below in more detail with reference to the accompanying drawings in accordance with the embodiments.

Figure 1A:
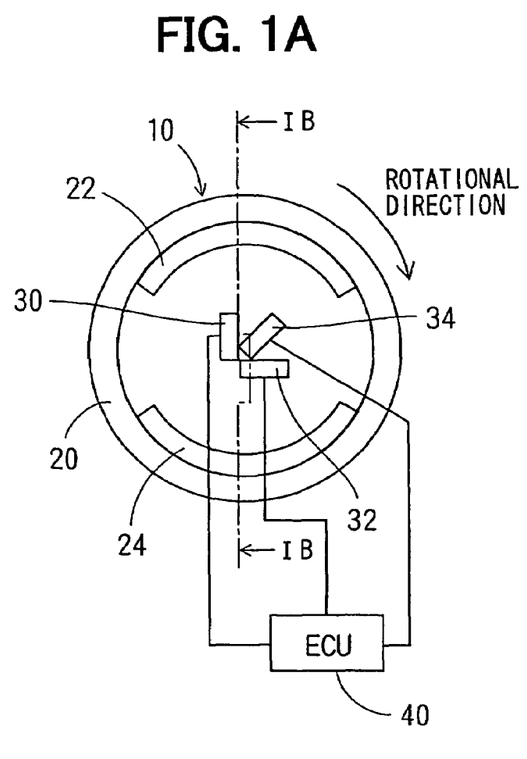
FIG. 1A is a schematic end view of an angular position sensor according to a first embodiment of the present invention.
Figure 1B:
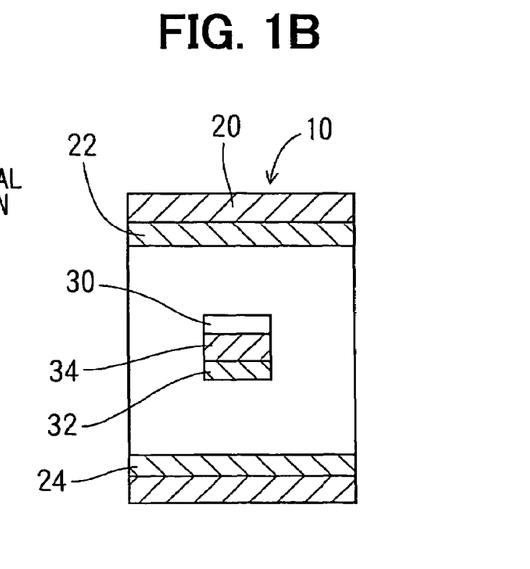
FIG. 1B is a cross-sectional view of the angular position sensor of the first embodiment of the present invention taken through the line IB-IB of FIG. 1A.

An angular position sensor according to a first embodiment of the present invention is shown in FIGS. 1A–1B. For example, the angular position sensor 10 is intended to detect the angle of rotation of a target object 4 such as crankshafts or traction wheels. The angular position sensor 10 includes a cylindrical yoke 20, a pair of permanent magnets 22 and 24 for forming a parallel magnetic field, Hall elements 30, 32, and 34, and an electronic control unit (ECU) 40 serving as computing means. As illustrated in FIG. 1, the ECU 40 is located away from the Hall elements 30, 32, and 34, and wired to the Hall elements 30, 32, and 34. However, in practice, the Hall elements 30, 32, and 34 and the ECU 40 are integrated in one-chip semiconductor device. This semiconductor device is attached to a support member (not shown). For alignment purposes, engagement grooves or dowel pins are used in installing the support member to which attached is the semiconductor device having the Hall elements 30, 32, and 34 and the ECU 40 as well as installing the yoke 20 having the permanent magnets 22 and 24 attached to the inner circumferential wall thereof onto a target object. The installations are done generally at an angular position of 45 degrees at which the Hall element 34 delivers an output of zero in the presence of a magnetic field after a correction for an offset-has been made to the output as discussed later.

The yoke 20 and the permanent magnets 22 and 24 serve as magnetic field generator means which rotates in conjunction with a target object whose angle of rotation is to be detected. The permanent magnets 22 and 24 are formed arcuately and located opposite to each other by 180 degrees on the inner circumferential wall of the cylindrical yoke 20. The permanent magnets 22 and 24 form a parallel magnetic field of a constant magnetic flux density.

The Hall elements 30, 32, and 34 are located generally at the center of the yoke 20, with a constant current supplied to the Hall elements 30, 32, and 34. One of the Hall elements 30 and 32 corresponds to a first magnetic sensor element, and the other to a second magnetic sensor element. The Hall element 34 corresponds to a third magnetic sensor element. The Hall element 30 forms an angle of 90 degrees with respect to the Hall element 32 in the direction of rotation of the target object. The angle formed in the direction of rotation of the target object between the Hall element 34 and the Hall element 30 and the angle formed in the direction of rotation of the target object between the Hall element 34 and the Hall element 32 are 45 degrees and equal to each other.

As described above, the yoke 20 and the permanent magnets 22 and 24 rotate in conjunction with the target object. At this time, as shown in FIG. 9, the sinusoidal output signal 100 delivered as a voltage by the Hall element 30 is different in phase by 90 degrees from the sinusoidal output signal 102 delivered as a voltage by the Hall element 32. In other words, the output signals from the Hall elements 30 and 32 have a sine and cosine relation. Accordingly, Va and Vb are expressed by the following equations (1) and (2);

$$Va = kBI^* \sin \theta \quad (1)$$

$$Vb = kBI^* \sin(\theta + 90) = kBI^* \cos \theta \quad (2)$$

where θ is the angle of rotation of the target object, Va is the output signal 100 from the Hall element 30, Vb is the output signal 102 from the Hall element 32, k is the coefficient determined in accordance with the sensitivity of the Hall elements 30 and 32, B is the magnetic flux density of a magnetic field formed by the permanent magnets 22 and 24, and I is the constant current supplied to the Hall elements 30 and 32.

The ECU 40 includes a non-volatile rewritable memory such as an EEROM for storing a rotational angle sensing program, and a CPU for executing the rotational angle sensing program.

As stated in the description of the related art, the output from the Hall elements may have an offset or a variation in gain during their manufacture or installation. In this case, the angle of rotation of the target object cannot be properly determined based on the output signals Va and Vb of the Hall elements 30 and 32 which have an offset or a variation in gain.

Figure 5:
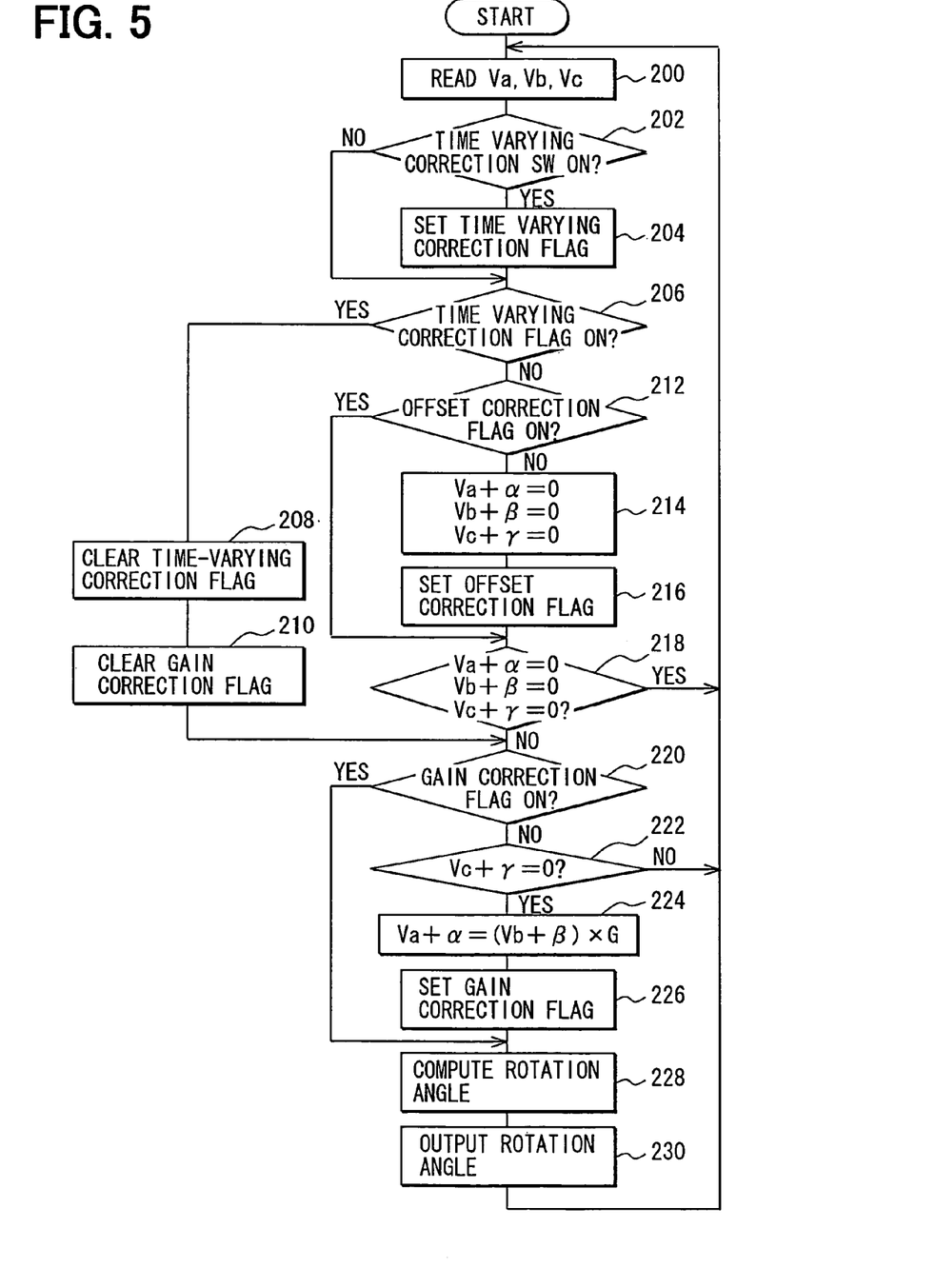
FIG. 5 is a flowchart of a rotational angle sensing program according to the angular position sensor of the first embodiment of the present invention.

In this context, a reference is now made to the rotational angle sensing program of FIG. 5. Explained are the steps of correcting for an offset of the Hall elements 30, 32, and 34 based on the output signals from the Hall elements 30, 32, and 34, and correcting the gain of the Hall elements 30 and 32 to sense the angle of rotation of the target object. The rotational angle sensing program shown in FIG. 5 is continuously executed during the operation of the angular position sensor. When the rotational angle sensing program shown in FIG. 5 is executed for the first time, the Hall elements 30, 32, and 34 are not integrated with the yoke 20 and the permanent magnets 22 and 24 and, thus, not exposed to a magnetic field. Additionally, in the initial condition, each flag of the rotational angle sensing program shown in FIG. 5 is cleared.

First, in step 200, the process reads the output signals Va, Vb, and Vc from the Hall elements 30, 32, and 34. Then, in step 202, the process determines whether a time-varying correction SW has been depressed and thereby turned ON. The time-varying correction SW is depressed and thereby turned ON by an operator. If the time-varying correction SW is ON, then the process sets a time-varying correction flag at step 204.

On the other hand, if the time-varying correction SW is OFF in step 202, then the process proceeds to step 206. The time-varying correction SW is not necessarily required to set the time-varying correction flag. That is, the time-varying correction flag may also be set, e.g., when the count of offset-corrected outputs of zero from the Hall element 34 has exceeded a predetermined value after the angular position sensor 10 has been installed in place. For a time-varying correction flag, a non-volatile memory is employed.

In step 206, the process determines whether the time-varying correction flag is ON. If the time-varying correction flag is ON, then the process clears the time-varying correction flag and a gain correction flag at steps 208 and 210, respectively. Thereafter, the process proceeds to step 220.

If the time-varying correction flag is OFF in step 206, then the process determines in step 212 whether an offset correction flag is ON. If the offset correction flag is ON, i.e., if the offset has been corrected for, then the process proceeds to step 218. For the offset correction flag, a non-volatile memory is employed.

If the offset correction flag is OFF in step 212, i.e., if the offset has not been corrected for, then the process determines that the Hall elements 30, 32, and 34 have not been integrated with the yoke 20 and the permanent magnets 22 and 24, with the Hall elements 30, 32, and 34 not exposed to a magnetic field.

Figure 2:
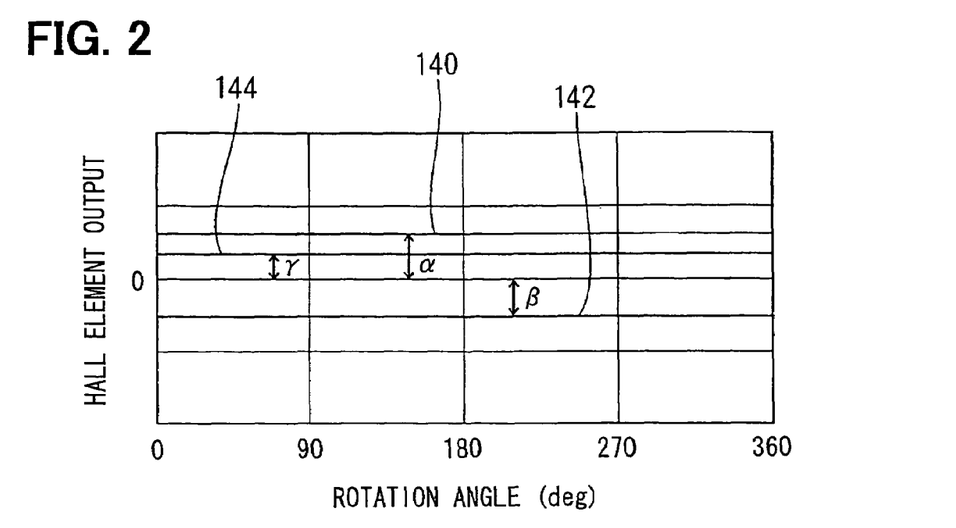
FIG. 2 is a graph showing an offset of Hall elements of the angular position sensor of the first embodiment of the present invention.

When read without being exposed to a magnetic field, output signals 140, 142, and 144 provided by the Hall elements 30, 32, and 34 are zero if no offset is present; however, in practice, the output signals 140, 142, and 144 may have offsets α, β, and γ as shown in FIG. 2.

Figure 3:
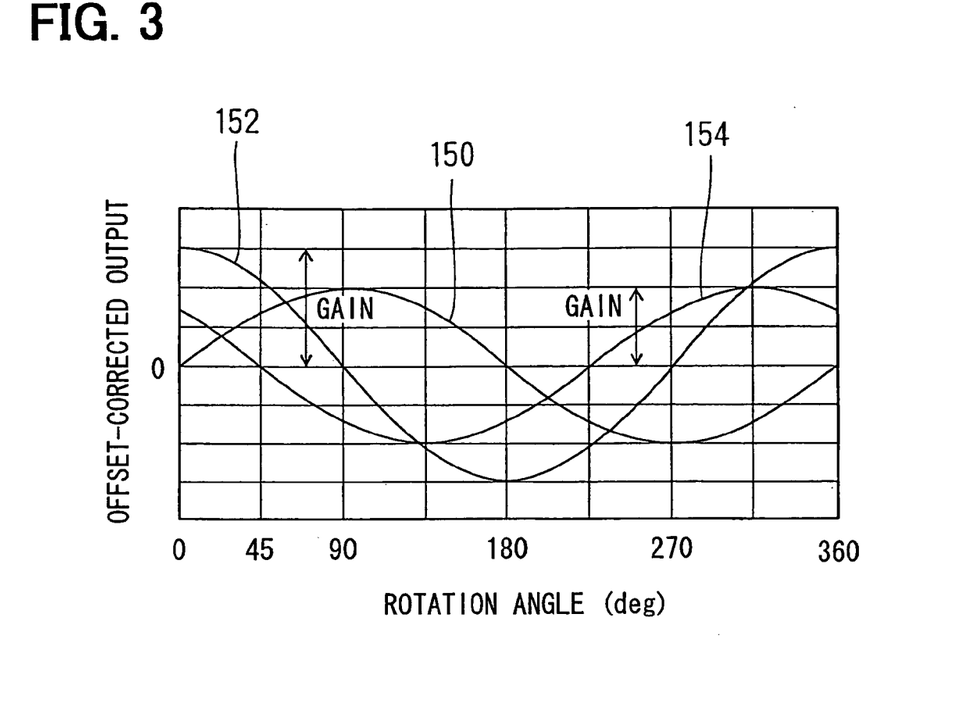
FIG. 3 is a graph showing a relationship between a rotational angle and an offset-corrected output of the Hall elements of the angular position sensor of the first embodiment of the present invention.

In step 214, the offsets α, β, and γ of the Hall elements 30, 32, and 34 are detected and then stored in a non-volatile memory. Thereafter, in step 216, the offset correction flag is set. After the offset has been corrected for, the Hall elements 30, 32, and 34, the yoke 20, and the permanent magnets 22 and 24 are combined into one piece. With the Hall elements 30, 32, and 34, the yoke 20, and the permanent magnets 22 and 24 being integrated in one piece, offset-corrected outputs 150 (Va+α), 152 (Vb+β), and 154 (Vc+γ) from the Hall elements 30, 32, and 34 are not zero at the same rotational angular position, as shown in FIG. 3.

In step 218, the process determines whether the offset-corrected outputs from the Hall elements 30, 32, and 34 are zero. This determination is made to know if the Hall elements 30, 32, and 34, the yoke 20, and the permanent magnets 22 and 24 have been integrated with each other after the offsets have been corrected for in step 214.

If the offset-corrected outputs from the Hall elements 30, 32, and 34 are zero in step 218, then the process determines that the Hall elements 30, 32, and 34, the yoke 20, and the permanent magnets 22 and 24 have not been integrated with each other. Thereafter, the process returns to step 200. If the offset-corrected outputs from the Hall elements 30, 32, and 34 are not zero, then the process determines that the Hall elements 30, 32, and 34, the yoke 20, and the permanent magnets 22 and 24 have been integrated with each other. Thereafter, the process proceeds to step 220.

In step 220, the process determines whether the gain correction flag is ON. If the gain correction flag is ON, i.e., if the gain has been corrected, then the process proceeds to step 228. For the gain correction flag, employed is a non-volatile memory.

If the gain correction flag is OFF in step 220, i.e., if the gain has not been corrected, then the process determines whether the offset-corrected output (Vc+γ) of the Hall element 34 is zero at step 222. If the offset-corrected output of the Hall element 34 is not zero, then the process returns to step 200.

As described above, for alignment purposes, engagement grooves or dowel pins are used in installing the support member with the semiconductor device having the Hall elements 30, 32, and 34 and the ECU 40 as well as installing the yoke 20 having the permanent magnets 22 and 24 attached to the inner circumferential wall thereof onto a target object. The installation is done generally at an angular position of 45 degrees at which the Hall element 34 delivers the offset-corrected output (Vc+γ) of zero. Accordingly, the process can detect in step 222 that (Vc+γ)=0 only by slightly rotating the target object.

Figure 4:
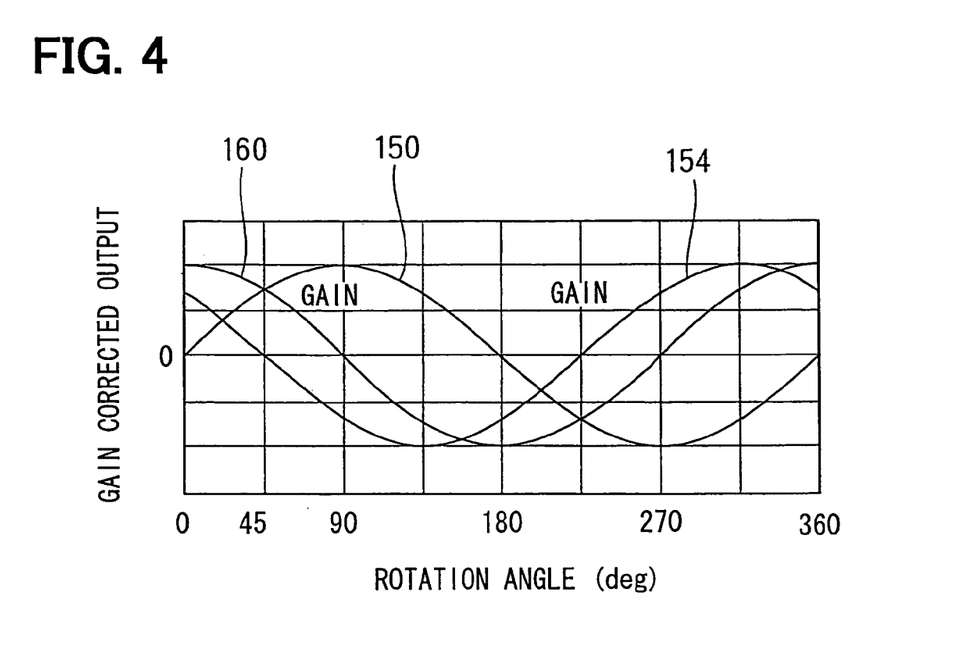
FIG. 4 is a graph showing the relationship between the rotational angle and a gain-corrected output of the Hall elements of the angular position sensor of the first embodiment of the present invention.

At an angular position of 45 degrees at which (Vc+γ)=0, the angular position sensor 10 according to the first embodiment has an ideal output ratio (Va+α)/(Vb+β)=1. This holds true if no variations are present in gain of the Hall elements 30 and 32, where (Va+α) and (Vb+β) are the offset-corrected outputs of the Hall elements 30 and 32. In this context, a gain coefficient G by which multiplied is the offset-corrected output (Vb+β) of the Hall element 32 is determined so that the offset-corrected gains of the Hall elements 30 and 32 coincide with each other at step 224. The process then sets the gain correction flag at step 226. The gain coefficient is stored in a non-volatile memory. As shown in FIG. 4, the outputs 150 and 160 of the Hall elements 30 and 32 thus coincide in gain with each other. In FIG. 4, the gains of the Hall elements 30 and 32 and the gain of the Hall element 34 coincide with each other. However, since the Hall element 34 is used only to detect an angular position at which the output from the Hall element 34 is zero, it is thus not necessary for the gains of the Hall elements 30 and 32 and the gain of the Hall element 34 to coincide with each other.

In step 228, in accordance with the ratio of (Va+α) to (Vb+β)*G, which are the offset-corrected and gain-corrected outputs from the Hall elements 30 and 32, respectively, the process calculates tan θ according to the following equation (3). Then, the process employs an arc tangent operation according to the following equation (4) to find the calculated angle 110 shown in FIG. 10. The cycle of the calculated angle 110 is 180 degrees.

$$(Va+α)/(Vb+β)*G = \sin θ/\cos θ = \tan θ \quad (3)$$

$$θ = \arctan\{(Va+α)/(Vb+β)*G\} \quad (4)$$

Furthermore, as described above, the ECU 40 determines the signs of the offset-corrected and gain-corrected output signals of the Hall elements 30 and 32 as shown in FIG. 12 in order to identify the rotational angular position of the target object within an angular range of 360 degrees. In accordance with the identified rotational angular position of the target object, the process combines an offset angle and the calculated angle 110 by addition to find the output angle 120 shown in FIG. 11. The angle of rotation of the target object is thus detected. Then, in step 230, the process outputs the detected angle of rotation, and thereafter returns to step 200.

In the first embodiment, since the phase difference between the output signals from the Hall elements 30 and 32 is 90 degrees, an arc tangent operation was employed to facilitate the calculation of the angle of rotation of the target object according to equations (3) and (4). However, suppose that the Hall element 30 forms an angle of other than 90 degrees with respect to the Hall element 32 in the rotational direction of the target object, and the phase difference Φ between the output signals of the Hall elements 30 and 32 is not 90 degrees. Even in this case, as shown in the following equations (5) and (6), it is possible to calculate the rotational angle θ of the target object through a trigonometric inverse operation in accordance with the output signals Va and Vb of the Hall elements 30 and 32. In equations (5) and (6), it is assumed that Va and Vb have been offset-corrected and gain corrected.

$$\tan θ = \cot (Φ/2) \times (Va-Vb)/(Va+Vb) \quad (5)$$

$$θ \arctan \{\cot (Φ/2) \times (Va-Vb)/(Va+Vb)\} \quad (6)$$

Figure 6:
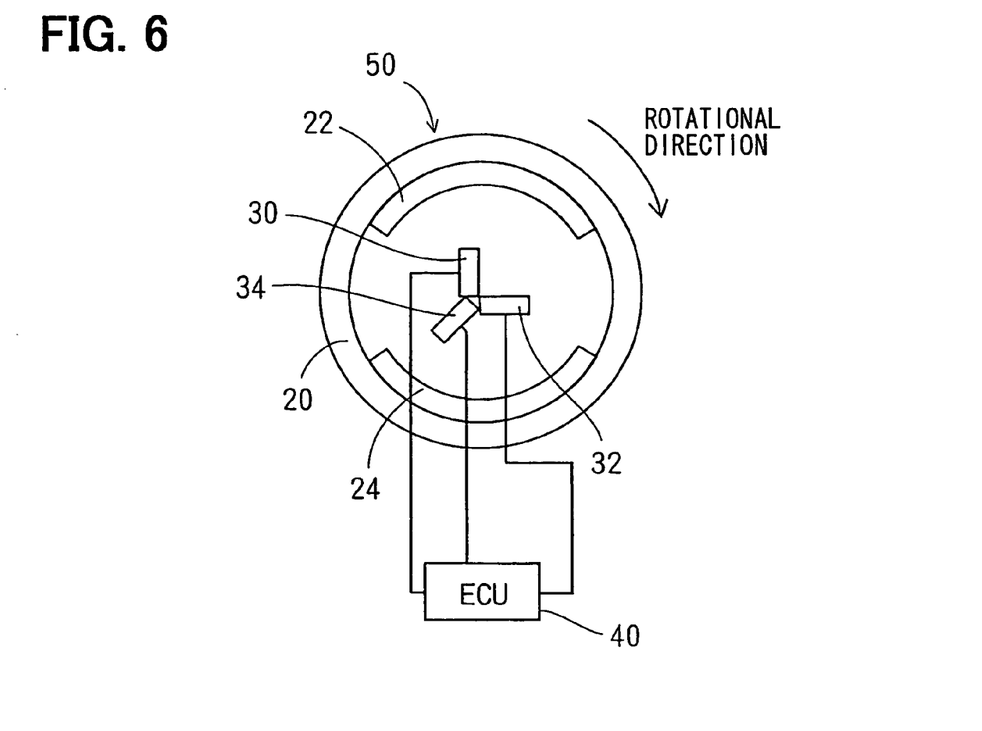
FIG. 6 is a schematic end view of an angular position sensor according to a second embodiment of the present invention.
Figure 7:
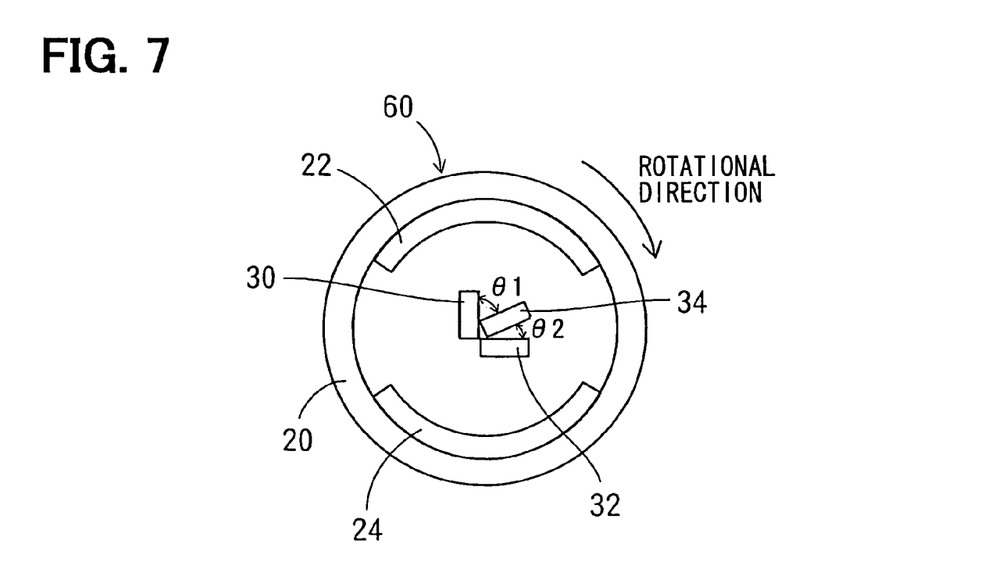
FIG. 7 is a schematic end view of an angular position sensor according to a third embodiment of the present invention.

Second and third embodiments of the present invention are shown in FIGS. 6 and 7, respectively. In these drawings, the components that are substantially the same as those of the first embodiment are designated by like symbols and will not be explained repeatedly.

In FIG. 6, there is shown an angular position sensor 50 according to the second embodiment. As illustrated, the Hall element 34 serving as the third magnetic sensor element is located opposite by 180 degrees to the location of the Hall element 34 of the first embodiment. That is, the Hall element 34 is located at an intermediate position in the angle of 270 degrees that is formed between the Hall element 30 and the Hall element 32 in the rotational direction of the target object. In this case, the phase of the output signal from the Hall element 34 is equal to a phase inverted by 180 degrees from that of the output 154 of FIG. 4. The second embodiment also employs the rotational angle sensing program shown in FIG. 5 to make an offset correction and a gain correction and then detect the angle of rotation of the target object.

As illustrated in FIG. 7, the third embodiment is adapted such that the Hall elements 30 and 32 form an angle of 90 degrees in the rotational direction of the target object.

However, the Hall element 34 serving as the third magnetic sensor element forms an angle θ1 of 60 degrees with respect to the Hall element 30 serving as the first magnetic sensor element in the rotational direction of the target object. Additionally, the Hall element 34 serving as the third magnetic sensor element forms an angle θ2 of 30 degrees with respect to the Hall element 32 serving as the second magnetic sensor element in the rotational direction of the target object. Accordingly, the output signal from the Hall element 34 is shifted by 15 degrees in phase from the offset-corrected output 154 of the Hall element 34 shown in FIG. 3, and is zero at a rotational angular position of 60 degrees. In this case, at the rotational angular position of 60 degrees, the ideal output ratio $(Va+\alpha)/(Vb+\beta)=3^{1/2}$, assuming that the offset-corrected outputs $(Va+\alpha)$ and $(Vb+\beta)$ from the Hall elements 30 and 32 have no variation in gain.

Accordingly, at the rotational angular position of 60 degrees at which the Hall element 34 provides an output of zero, the gain coefficient G is determined which satisfies the following equation (7) in order to meet the condition that $(Va+\alpha)/(Vb+\beta)=3^{1/2}$.

$$(Va+\alpha)=(Vb+\beta)*3^{1/2}*G \quad (7)$$

In the aforementioned embodiments, a correction is made to the offset of the outputs from the Hall elements 30, 32, and 34 in the absence of a magnetic field. Thereafter, at a rotational angular position at which the Hall element 34 serving as the third magnetic sensor element provides an output of zero, a correction is made to the gain of the outputs from the Hall elements 30 and 32 so that the gains of the Hall elements 30 and 32 coincide with each other. As a result, this makes it possible to correct the gain of the outputs of the Hall elements 30 and 32 only by slightly rotating the target object near the rotational angular position at which the Hall element 34 serving as the third magnetic sensor element provides an output of zero. Accordingly, it is possible to reduce the time for correcting the output from the Hall elements 30 and 32 to detect the angle of rotation of the target object.

Furthermore, even when the range of rotational angles of the target object is as narrow as, e.g., below 90 degrees, it is also possible to correct the output from the Hall elements 30 and 32.

In the aforementioned embodiments, the magnetic field generator means is adapted to rotate in conjunction with the target object. However, the magnetic sensor means may be rotated in conjunction with the target object.

Furthermore, although the Hall element was used as the magnetic sensor element, a magneto-resistive element can also be employed as the magnetic sensor element to detect the angle of rotation of the target object. The magnetic sensor element has a cycle of 180 degrees. Thus, to facilitate the calculation of the angle of rotation of the target object through a trigonometric arc tangent operation, it is desirable that the phase difference between the magneto-resistive elements employed as the first and second magnetic sensor elements be 45 degrees. In this case, the angle formed between the magneto-resistive element used as the first magnetic sensor element and the magneto-resistive element used as the third magnetic sensor element are desirably equal to the angle formed between the magneto-resistive element used as the second magnetic sensor element and the magneto-resistive element used as the third magnetic sensor element. Here, both the angles are formed in the rotational direction of the target object. It is also acceptable to employ any magnetic sensor element other than the Hall element or the magneto-resistive element so long as the magnetic sensor element outputs a signal in response to a change in direction of a magnetic field and is subjected to offsets or variations in gain.

In the aforementioned embodiments, the Hall elements 30, 32, and 34 and the ECU 40 are integrated in a one-chip semiconductor device. However, it is also acceptable to provide the Hall elements 30, 32, and 34 and the ECU 40 separately.

The angular position sensor according to the aforementioned embodiments can also be adapted to determine a rate of change in rotational angle over time, thereby serving as a rotational angular speed sensor.

What is claimed is:

1. An angular position sensor for sensing an angle of rotation of a target object, the angular position sensor comprising:

magnetic field generator means for producing a magnetic field; and magnetic sensor means having a first magnetic sensor element, a second magnetic sensor element, and a third magnetic sensor element each for providing an output signal depending on a direction of the magnetic field, computing means for calculating the angle of rotation of the target object based on output signals of the three magnetic sensor elements, wherein one of the magnetic field generator means and the magnetic sensor means rotates in conjunction with the target object, the first, second, and third magnetic sensor elements are located so as to provide output signals having different phase differences by allowing the magnetic sensor means to rotate relative to the magnetic field generator means, and the first, second, and third magnetic sensor elements are located based on predetermined angular relationships therebetween such that each magnetic sensor element outputs an output signal having a phase different from an inverted phase of an output signal of any other magnetic sensor element;

the computing means determines an offset by which an output from each of the magnetic sensor elements is corrected to zero when the magnetic field is absent, and the computing means makes a correction to a gain of an output from at least one of the first magnetic sensor element and the second magnetic sensor element so that the outputs from the first magnetic sensor element and the second magnetic sensor element coincide with each other at a rotational angular position of the target object at which the third magnetic sensor element provides an output of zero when the magnetic field is present, the correction being made in accordance with an ideal output ratio between the outputs from the first magnetic sensor element and the second magnetic sensor element, the ideal output ratio being defined by an angle between the first magnetic sensor element and the third magnetic sensor element and by an angle between the second magnetic sensor element and the third magnetic sensor element with respect to a rotational direction of the target object; and the computing means calculates an angle of rotation of the target object through a trigonometric inverse operation in accordance with the offset-corrected and gain-corrected outputs from the first and second magnetic sensor elements.

2. The angular position sensor according to claim 1, wherein the first, second, and third magnetic sensor elements are Hall elements.

3. The angular position sensor according to claim 2, wherein the first magnetic sensor element and the second magnetic sensor element are located so as to provide output signals having a phase difference of 90 degrees.

4. The angular position sensor according to claim 3, wherein the angle between the first magnetic sensor element and the third magnetic sensor element is equal to the angle between the second magnetic sensor element and the third magnetic sensor element with respect to the rotational direction of the target object.

5. The angular position sensor according to claim 1, wherein the first, second, and third magnetic sensor elements are magneto-resistive elements.

6. The angular position sensor according to claim 5, wherein the first magnetic sensor element and the second magnetic sensor element are located so as to provide output signals having a phase difference of 45 degrees.

7. The angular position sensor according to claim 6, wherein the angle between the first magnetic sensor element and the third magnetic sensor element is equal to the angle between the second magnetic sensor element and the third magnetic sensor element with respect to the rotational direction of the target object.

8. An angular position sensing method for sensing an angle of rotation of a target object using an angular position sensor having a magnetic field generator for producing a magnetic field and a magnetic sensor wherein one of the magnetic field generator and the magnetic sensor rotates in conjunction with the target object, the method comprising:

determining an offset by which an output signal depending on a direction of the magnetic field from each of first, second and third magnetic sensor elements of the magnetic sensor is corrected to zero when the magnetic field is absent, the first, second and third sensor elements being located so that their output signals have different phase differences by allowing the magnetic sensor to rotate relative to the magnetic field generator and such that each output signal of each magnetic sensor element has a phase different from an inverted phase of an output signal of the other two magnetic sensor elements based on predetermined angular relationships between the first, second and third magnetic sensor elements;

making a correction to a gain of an output from at least one of the first magnetic sensor element and the second magnetic sensor element so that the outputs from the first magnetic sensor element and the second magnetic sensor element coincide with each other in the presence of the magnetic field at a rotational angular position of the target object at which the third magnetic sensor element provides an output of zero, the gain correction being made in accordance with an ideal output ratio between the outputs from the first magnetic sensor element and the second magnetic sensor element, the ideal output ratio being defined by an angle formed in a rotational direction of the target object between the first magnetic sensor element and the third magnetic sensor element and by an angle formed in a rotational direction of the target object between the second magnetic sensor element and the third magnetic sensor element; and calculating an angle of rotation of the target object through a trigonometric inverse operation in accordance with the offset-corrected and gain-corrected outputs from the first and second magnetic sensor elements.

\* \* \* \* \*